US011490210B2

(12) United States Patent
Oclee-Brown et al.

(10) Patent No.: US 11,490,210 B2
(45) Date of Patent: Nov. 1, 2022

(54) LOUDPSEAKERS

(71) Applicant: GP Acoustics International Limited, Kwai Chung (HK)

(72) Inventors: Jack Anthony Oclee-Brown, Staplehurst (GB); Christopher Spear, Waterlooville (GB)

(73) Assignee: GP ACOUSTICS INTERNATIONAL LIMITED, Kwai Chung (HK)

( * ) Notice: Subject to any disclaimer, the term of this patent is extended or adjusted under 35 U.S.C. 154(b) by 0 days.

(21) Appl. No.: 17/151,520

(22) Filed: Jan. 18, 2021

(65) Prior Publication Data

US 2021/0227331 A1 Jul. 22, 2021

(30) Foreign Application Priority Data

Jan. 22, 2020 (GB) ..................................... 1917247

(51) Int. Cl.
*H04R 9/06* (2006.01)
*H04R 9/02* (2006.01)
(Continued)

(52) U.S. Cl.
CPC ........... *H04R 9/063* (2013.01); *H04R 1/2873* (2013.01); *H04R 9/025* (2013.01); *H04R 9/046* (2013.01);
(Continued)

(58) Field of Classification Search
CPC ........ H04R 1/225; H04R 1/2873; H04R 3/12; H04R 9/025; H04R 9/046; H04R 9/06;
(Continued)

(56) References Cited

U.S. PATENT DOCUMENTS 4,550,430 A * 10/1985 Meyers .................. H04R 3/002 381/401
4,805,221 A 2/1989 Quaas
(Continued)

FOREIGN PATENT DOCUMENTS

CN 109151680 A 1/2019
EP 1257147 A2 11/2002
(Continued)

OTHER PUBLICATIONS

Search Report issued for related GB application serial No. GB1917247.7, dated May 13, 2020.

*Primary Examiner* — Huyen D Le
(74) *Attorney, Agent, or Firm* — Westman, Champlin & Koehler, P.A.; Z. Peter Sawicki; Amanda M. Prose

(57) ABSTRACT

A loudspeaker comprising two acoustic diaphragms mounted to face in axially-opposed directions, two voice coils each having an axis and an axial length and being configured to reciprocate along its axis to drive one of the diaphragms, the axes being substantially parallel and both axes passing through both diaphragms, and at least one magnet forming part of a chassis assembly configured to provide two axially-extending gaps, one for each of the voice coils to reciprocate within, wherein the at least one magnet and the chassis assembly are adapted so that magnetic flux flows across the gaps in opposite directions, and wherein when in use the diaphragms are at their predetermined maximum negative excursions the voice coils overlap in the axial direction by between 10% and 90% of their average axial length, and wherein when in use the diaphragms are in a relaxed position, between their maximum negative and positive excursions, the voice coils do not overlap in the axial direction.

12 Claims, 4 Drawing Sheets

(51) Int. Cl.
*H04R 9/04* (2006.01)
*H04R 1/28* (2006.01)

(52) U.S. Cl.
CPC ......... *H04R 9/06* (2013.01); *H04R 2209/026* (2013.01); *H04R 2499/11* (2013.01)

(58) Field of Classification Search
CPC .............. H04R 9/063; H04R 2209/026; H04R 2499/11; H04M 1/03; H04M 1/035
See application file for complete search history.

(56) References Cited

U.S. PATENT DOCUMENTS 6,744,895 B2 * 6/2004 Miyamoto ............. H04R 9/063 381/182
7,106,878 B2 * 9/2006 Saiki ....................... H04M 1/03 381/182
7,519,191 B2 * 4/2009 Enomoto ............... H04R 9/025 381/186
7,711,131 B2 * 5/2010 Furuya .................. H04M 1/035 381/182
2005/0041831 A1 * 2/2005 Stiles ..................... H04R 9/022 381/412
2014/0211963 A1 7/2014 Dodd
2015/0078610 A1 * 3/2015 Voishvillo ............. H04R 9/025 381/396

FOREIGN PATENT DOCUMENTS

GB 2491108 A 11/2012
GB 2567673 A 4/2019
WO 03/024151 A1 3/2003

* cited by examiner

LOUDPSEAKERS

FIELD OF THE INVENTION

The present invention relates to loudspeakers, and in particular to mirrored coaxial acoustic arrays with a nested motor structure.

BACKGROUND ART

The structure and operation of moving coil loudspeaker drive units is well known. A vibration diaphragm is attached to a coil of wire known as a voice coil, and the voice coil is placed in a magnetic field usually provided by one or more permanent magnets. By passing an alternating current through the voice coil, a force is induced and the diaphragm can be made to vibrate and so radiate acoustic waves.

What is sometimes not appreciated is that the force induced in the voice coil also gives rise to an unintentional reactive force on the motor system, following Newton's third law of motion. The mechanical vibration resulting from the reactive force on the motor is transmitted via the driver chassis and can excite the walls of a loudspeaker enclosure; in many loudspeaker systems this form of excitation is the major cause of motion in the enclosure walls. Since the walls have large area and exhibit structural resonances they can radiate significant sound resulting in a tonally distorted output from the loudspeaker.

Various solutions have been proposed to avoid this magnet vibration. U.S. Pat. No. 4,805,221 is one of several which disclose a loudspeaker with two substantially identical diaphragms and drive assemblies, mounted back to back. The permanent magnets of each assembly are rigidly coupled together by tie bars such that any reactive force in one magnet is cancelled by the opposing reactive force in the other. In this way magnet vibration is reduced along with the corresponding sound radiation from the enclosure walls. Our own UK patent No. GB2491108 represents another approach using back to back drive assemblies.

The total thickness of a back to back loudspeaker is more than twice the axial thickness of each individual drive assembly, due to the need to ensure that in use the reciprocating parts do not impact on any static part, which would severely degrade the sound quality. One approach to make such arrangements significantly more compact in the axial direction is to integrate the two loudspeaker voice coil drivers coaxially, to "nest" the two motor structures, in what is referred to herein as a mirrored coaxial array. Mirrored coaxial array loudspeakers are often used in mobile phones and headphones, where quality of sound reproduction is of lesser importance than compact size; in such arrangements the maximum excursions of the voice coils (the distances between the furthest positions the voice coils adopt in use away from their relaxed positions) are restricted so as to maintain the compact thickness of the loudspeaker. The axial compactness of mirrored coaxial arrays does not permit reaction force-cancelling or vibration-cancelling to the same extent as in back to back designs, so that the sound quality from such arrangements is compromised significantly compared to what is possible with back to back designs.

As an example of mirrored coaxial arrays, European patent application No. EP1257147 discloses a speaker for a mobile phone which includes: a first magnet; a second magnet provided so as to surround the first magnet; a yoke for connecting the first magnet and the second magnet; a first voice coil; a second voice coil; a first diaphragm connected to the first voice coil; a second diaphragm oppositely provided to the first diaphragm with respect to the first magnet and connected to the second voice coil; a first magnetic plate provided between the first diaphragm and the first magnet; and a second magnetic plate provided between the second diaphragm and the first magnet. The first voice coil is provided in a first magnetic gap between the first magnetic plate and the yoke. The second voice coil is provided in a second magnetic gap between the second magnetic plate and the yoke. This design is specifically designed so that the maximum voice coil excursions are small and generally the same for each coil so that the loudspeaker can be thin in the axial direction, and suitable for use in a mobile phone. The magnetic circuits are arranged so that the magnetic flux in the magnetic gaps flows in opposite directions; this is so as to maximise the driving force on the voice coils and to provide sufficient driving force within the constraints of limiting the thickness of the arrangement. The maximum excursions of the voice coils are constrained by the need to keep the speaker as thin as possible so as to fit within the thin case of a mobile phone (in the present invention "excursions" are the movements the voice coils make in the axial direction as they reciprocate, and the maximum excursions define the extremes of the reciprocal motion; the maximum positive excursion is when the driven diaphragms are at their furthest apart, and the maximum negative excursion is when the diaphragms are at their closest). As noted above, designs such as those in EP1257147 which minimise the thickness of the speaker significantly compromise the quality of sound reproduction.

SUMMARY OF THE INVENTION

The present invention is predicated on the realisation that if one compromises on the thickness of a mirrored coaxial array, and increases the maximum excursions beyond what is feasible with known designs, it is possible to design a loudspeaker which remains relatively compact but which is capable of higher quality sound reproduction than heretofore and yet still permits reaction force-cancelling or vibration-cancelling. The present invention therefore provides a loudspeaker comprising two acoustic diaphragms mounted to face in axially-opposed directions, two voice coils each having an axis and an axial length and each being configured to reciprocate along its axis to drive one of the diaphragms, the axes being substantially parallel and both axes passing through both diaphragms, and at least one magnet forming part of a chassis assembly configured to provide two axially-extending gaps, one gap for each of the voice coils to reciprocate within, wherein the at least one magnet and the chassis assembly are adapted so that magnetic flux flows across the gaps in opposite directions, and wherein when in use the diaphragms are at their predetermined maximum negative excursions the voice coils overlap in the axial direction by between 10% and 90% of their average axial length, and wherein when in use the diaphragms are in a relaxed position, between their maximum negative and positive excursions, the voice coils do not overlap in the axial direction.

With such an arrangement the voice coils overlap axially to a significant extent in use at maximum negative excursion, but the corollary to this is that the chassis assembly (the yoke and the magnet) needs to be thicker in the axial direction to accommodate the increased movement of the voice coils towards one another and maintain the necessary axial clearance, effectively increasing the axial thickness. The significant advantage is that it is possible to apply known reaction force-cancelling and/or vibration-cancelling techniques so as to improve the sound quality over known mirrored coaxial arrays. It is possible to ensure that the force generated by the drive system for each unit of electrical current flowing in the voice coil (the "BL") is constant when the voice coil is fully inside the magnetic gap. The voice coils must carry current in the same orientation in order to create a force pushing in opposite directions. This is because the magnetic field is radial but in the opposite direction in each of the two magnetic gaps. It would be assumed intuitively that this would lead to gross inductance problems because the coils would very significantly couple (and have a very significant mutual inductance) but, as will be explained, these are not in fact a problem in practice. Because the axes of both voice coils pass through both diaphragms, this means that the voice coils are "nested", so that one reciprocates within the circumference of the other (i.e. seen along the axial direction, the circumference of one voice coil sits entirely within the circumference of the other. The magnetic circuit in this mirrored coaxial array has two gaps and consequently is rather higher reluctance than a conventional motor circuit and this helps to reduce the effectiveness of the chassis assembly (usually a steel yoke) on amplifying the coil inductance.

The overlap of voice coils at maximum negative excursion may be more than 25%, preferably the overlap is more than 50%. If the voice coils are coaxial the radial forces between them are more likely to be balanced, and the design process is easier. The voice coils may have the same axial length, or one may be longer than the other—although the reciprocating masses are preferably substantially the same: as one voice coil is smaller than the other so as to fit with it, the masses are equalised by adding mass to one of the voice coil/diaphragm assemblies (in most cases the addition would be made to the arrangement having the inner voice coil).

The chassis may further comprise a cylindrical spacer shaped so as to extend axially and positioned so as to separate the two axially-extending magnetic gaps. Preferably the spacer is formed of a non-magnetic material such as aluminium. The spacer is surprisingly advantageous as it addresses inductance effects which would be caused by the voice coils coupling; in use, eddy currents are generated in the cylindrical aluminium spacer which reduce the self and mutual inductance of the voice coils, particularly when the coils are displaced rearwardly and immersed in the chassis assembly.

There may be a single magnet which may be annular and either enclosing the magnetic gaps or with one magnetic gap inside and one magnetic gap outside, or the magnet may be a disc magnet, with both magnetic gaps outside the magnet. Alternatively there may be both a disc magnet and an annular magnet surrounding it in which case the magnetic gaps would be sandwiched between the two magnets. The chassis assembly preferably comprises a yoke and/or end-plates, made of a magnetic material such as steel, to complete the magnetic circuit. It will be understood that the loudspeaker is adapted so that when in use the diaphragms move between their relaxed positions and their predetermined maximum positive excursions the voice coils do not overlap in the axial direction.

In the movement of each voice coil between the maximum negative and positive excursion of its associated diaphragm, the relaxed (or "at rest") position of a voice coil will usually be located midway between the maximum negative and positive excursions of the diaphragm. In use, the movement of the voice coils is synchronised in opposite directions, preferably so that the diaphragms and the voice coils reach their maximum positive and negative excursions at the same time. The movement of the voice coils in use may be such that the voice coils pass through their relaxed positions at the same time.

If the movement of the voice coils from their relaxed (or "at rest") positions to their maximum negative excursions is characterised as a movement from 0% to 100%, the range of this movement during which there is no axial overlap of the coils is preferably 0-50%, more preferably 0-30%, even more preferably 0-20%; in other words, the axial positions of the inner ends of the voice coils coincide, and axial overlap begins, at the 50%, or 30%, or 20% points in the total range of movement of the voice coils between the "at rest" position and their maximum negative excursions.

For brevity, the present invention is principally described with reference to circular voice coils (in the form of a substantially planar ring with a central hole); however, the invention applies equally to non-circular arrangements, such as oval, elliptical or race track shaped (figure of eight, or triangular/square/polygonal with rounded corners) voice coils, or any shape being symmetrical in one or two orthogonal directions lying in the general plane perpendicular to the voice coil axis and having a central hole.

BRIEF DESCRIPTION OF THE DRAWINGS

The invention will now be described by way of example and with reference to the accompanying figures, in which.

DETAILED DESCRIPTION OF THE EMBODIMENTS

Figure 1:
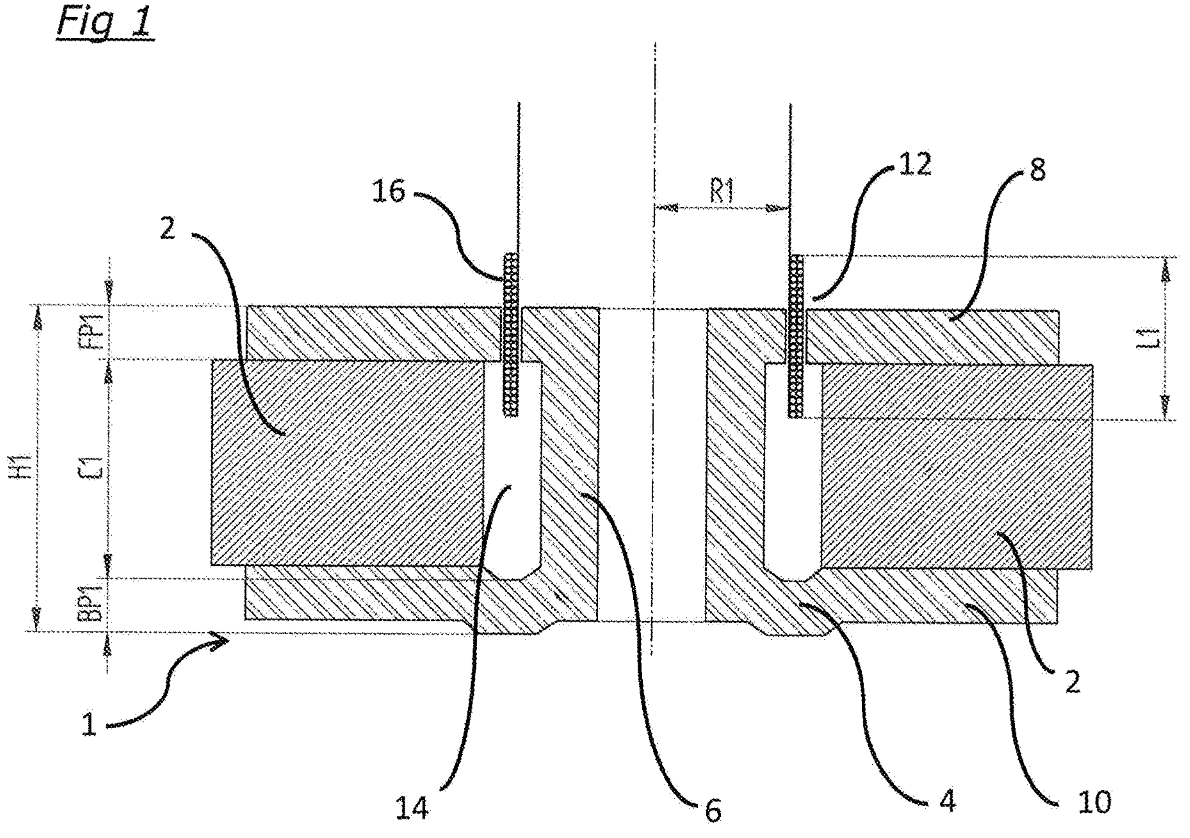
FIG. 1 is a schematic cross-sectional view of a conventional ring magnet loudspeaker drive unit.

FIG. 1 shows a conventional over-hung ring-magnet motor system 1. Normally two of these are placed back to back when used in a reaction-force cancelling/vibration-cancelling arrangement (as described in US 2014/211963). An annular magnet 2 surrounds a steel yoke 4 which is in the form of a central cylinder 6 with front and rear end plates 8, 10. There is a magnetic gap formed by a circular hole 12 in the front end plate 8, and the hole 12 leads directly to an axially-extending gap 14 between the magnet 2 and the cylindrical part 6 of the yoke 4. A voice coil 16 carrying a varying electric current reciprocates in the magnetic gap 12. The voice coil 16 is mounted at its outer end (the upper end as shown in the drawing) to a diaphragm (not shown) and the reciprocation of the voice coil causes the diaphragm to vibrate, creating acoustic waves as is well-known in the art. In use, the voice coil moves between a negative excursion (when the voice coil is displaced downwardly in the drawing) into the hole 12 and a positive excursion (when the voice coil is displaced upwardly in the drawing) out of the hole 12.

The coil length L1 and the thickness of the plate determine the maximum excursion of the motor system. The force generated by the motor system for each unit electrical current flowing in the coil (the BL) is constant when the coil is fully inside the gap. When the coil offset is ½ L1 the BL will drop to around 50% and this is typically the approximate maximum excursion (E1) of the motor system.

The total motor-system height (H1) is $$H1=BP1+FP1+C1$$

Figure 2:
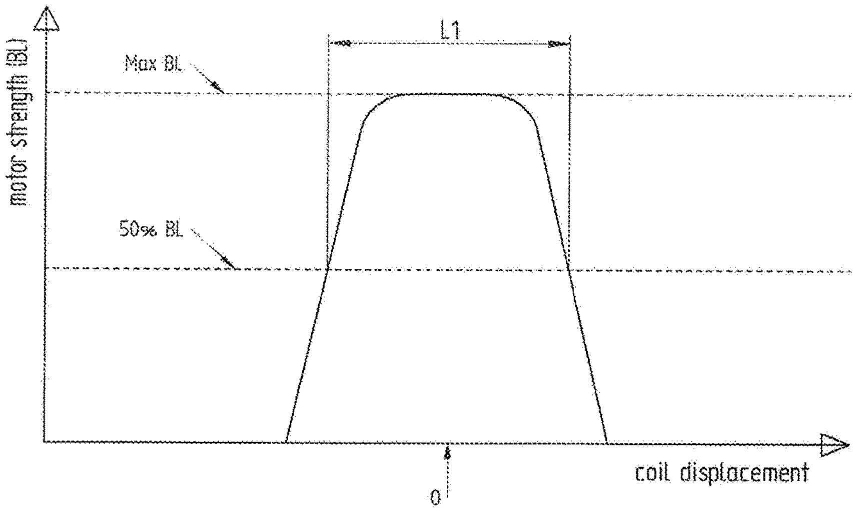
FIG. 2 is a diagram showing approximate motor strength as a function of voice coil displacement.

C1 is the distance between the gap and the yoke into which for the voice coil can move during usage. According to FIG. 2 the motor strength drops to a value close to zero if the voice coil moves completely out of the gap. However, in practice the voice coil is connected to a dynamic mechanical system and mechanical inertia can cause the voice coil to travel beyond this extent. Therefore it is common practice to build in some extra clearance margin to ensure that collision never occurs $$C1 = L1\left(1 + \frac{\text{clearance margin \%}}{100}\right)$$

A higher clearance margin provides a better guarantee that a collision won't occur, but this is at the expense of motor system compactness. Typical clearance margins are in the range of 10% to 50% depending on the application and required compactness of the loudspeaker driver.

Very often the thickness (BP1) of the back plate 10 and the thickness (FP1) of the front plate 8 will be the same or very close to the same. This is because both plates carry the magnetic flux in a similar orientation and therefore will have similar saturation when they are the same thickness (balancing saturation against steel quantity is the key aspect of motor system cost and performance optimisation).

Putting this all together, for two drivers placed back-to-back the total height of the two motor systems is approximately $$\text{total height} = 4 \times \text{plate thicknes} + 2 \times \text{coil length}\left(1 + \frac{\text{clearance margin \%}}{100}\right)$$

Figure 3:
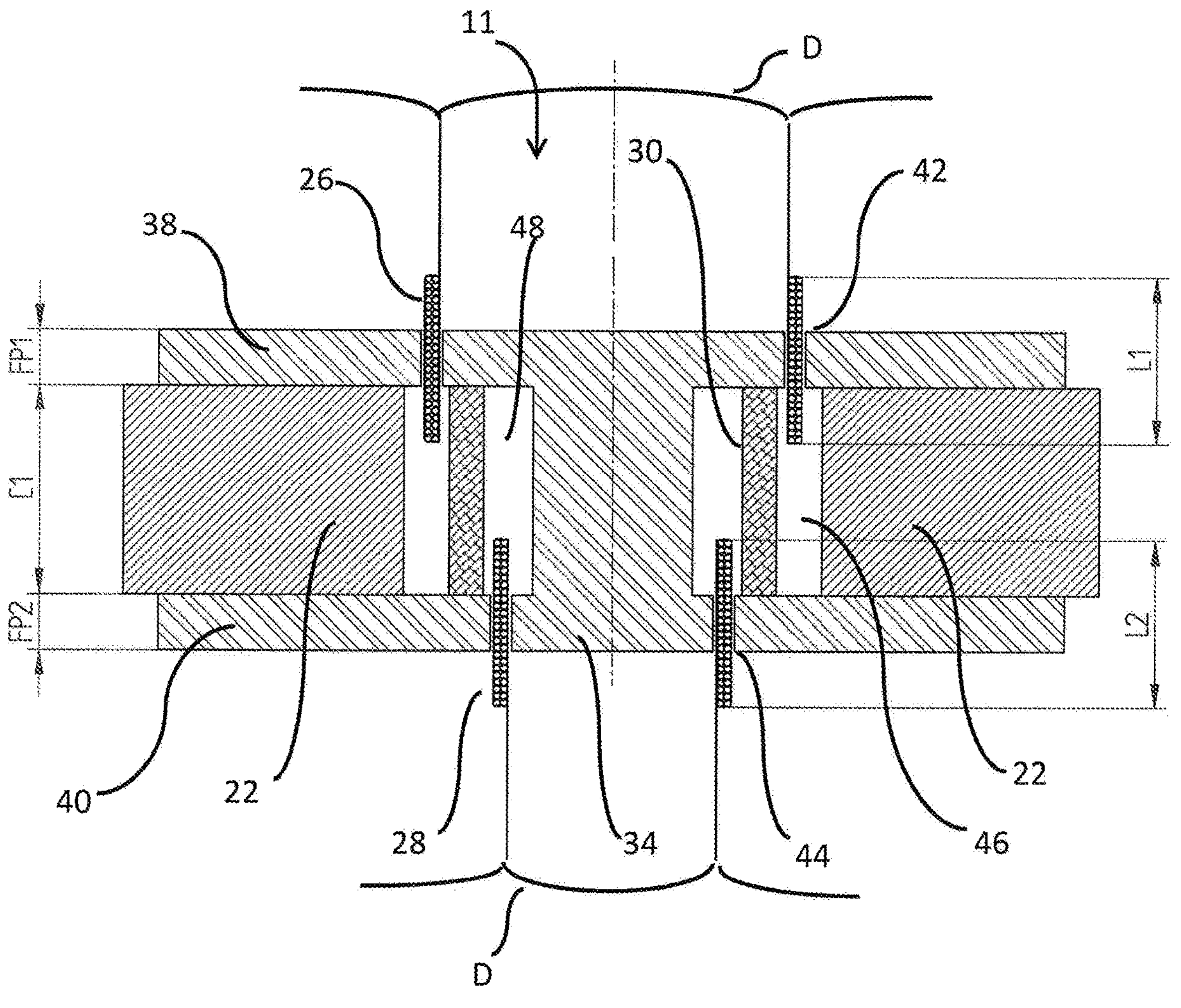
FIG. 3 is a cross-sectional schematic view of an embodiment of a mirrored coaxial array in accordance with the invention.

FIG. 3 shows an embodiment of a mirrored coaxial array 11 in accordance with the invention. In FIG. 3, two cylindrical voice coils 26, 28 with different diameters each drive a diaphragm D, and are coaxially located using a single ring magnet 22 to provide magnetic flux in two axially-extending gaps 46, 48. The drawing shows the voice coils 26, 28 in their "rest", or relaxed position, where there is no axial overlap. A non-ferrous cylindrical spacer 30 is provided to locate the steel yoke 34 in the correct location, and the spacer 30 also separates the two gaps 46, 48. The spacer 30 should be conductive to reduce the inductance of the two voice coils 26, 28. In use, the voice coils 26, 28 reciprocate through magnetic gaps 42,44 in the front and back end plates 38, 40 and into and out of axial gaps 46, 48 between a maximum positive excursion (when the two coils are furthest apart axially, when the coils would be further apart than as shown in FIG. 3) and a maximum negative excursion (when the two coils are axially closest together, as shown in FIG. 4).

Normally the aim is for the motor strength (BL) of both voice coils 26, 28 to be identical and also for the maximum excursion of both voice coils to be identical. Commonly the thickness FP1, FP2 of both end plates 38, 40 will be the same. The lengths L1, L2 of both coils 26, 28 will normally be the same. Under these conditions the clearances for the two coils will be the same. Under these conditions the total thickness (height in the drawing) of the dual motor system 11 is $$\text{total height} = 2 \times \text{plate thicknes} + \text{coil length}\left(1 + \frac{\text{clearance margin \%}}{100}\right)$$

i.e. half of the conventional motor system thickness/height.

Figure 4:
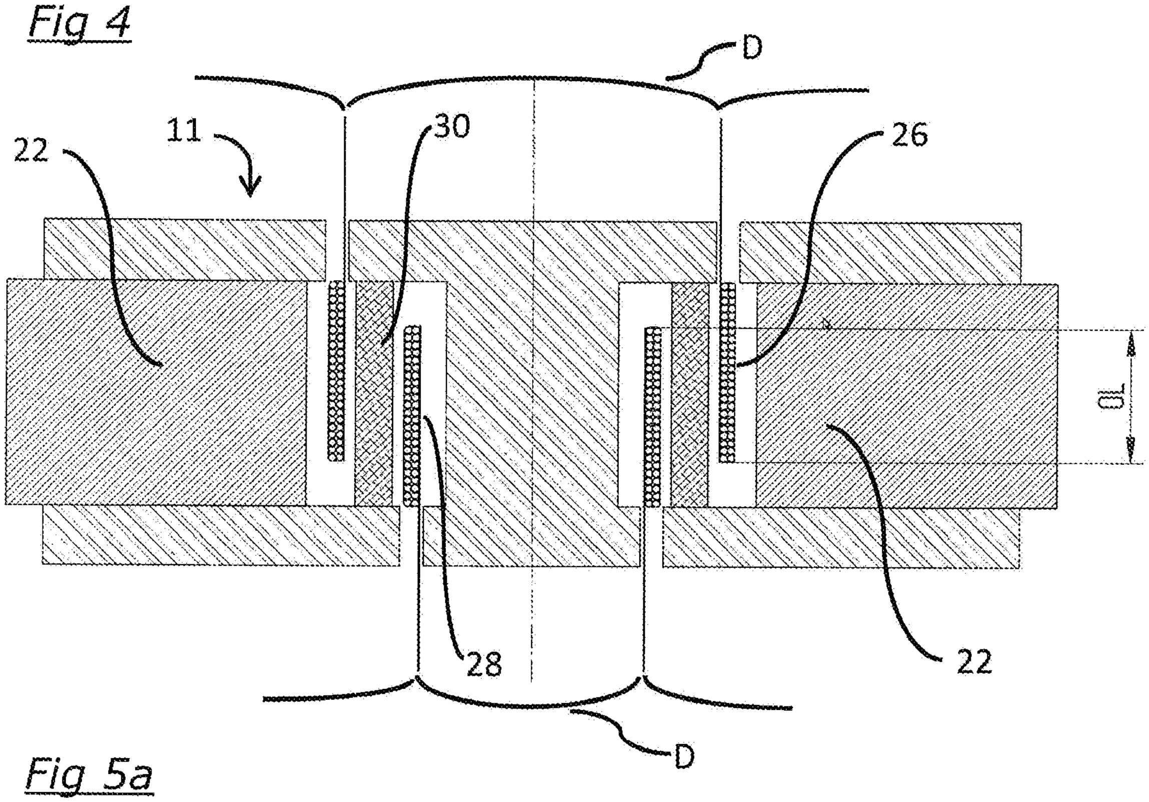
FIG. 4 is another view of the mirrored coaxial array of FIG. 3 in use and illustrating the maximum overlap of the voice coils, with the voice coils at maximum negative excursion, and FIGS. 5(*a*) to 5(*c*) are schematic illustrations of alternative embodiments of mirrored coaxial arrays.

At maximum negative excursion both coils 26, 28 will be displaced by approximately ½L1+½FP as shown in FIG. 4 and the coils overlap by a significant margin OL. This situation is quite extreme, since the motor strength is almost zero with the coils in this location, but it can easily occur at high power input levels and particularly due to the inertia of the moving parts of the loudspeaker driver.

Assuming that the coil lengths L1, L2 are the same, and the end plate thicknesses FP1, FP2 are the same, the overlap (OL) at this coil position is given by $$\text{max overlap} = \text{coil length}\left(1 - \frac{\text{clearance margin \%}}{100}\right)$$

From this it is obvious that the overlap can be expressed as a percentage of the voice coil length $$\text{max overlap \%} = 100 \times \frac{\text{max overlap}}{\text{coil length}} = 100 - \text{clearance margin \%}$$

Given typical clearance margins, the maximum voice coil overlap is between 50% and 90%.

Since one magnet ring 22 is used for both magnetic gaps 42, 44 it is usually necessary to use a large volume of magnet 22 than with a typical single motor system. In some cases this might mean that the clearance margin is greater than normal to allow the thickness of the magnet ring 22 to be as large as possible. This is clearly a balance between the motor-system strength and the motor-system thickness that the designer must fine tune. Even in this situation the maximum overlap of the coils would be significant and is likely to be at least 10% and probably more than 25%.

The magnetic field orientation in the two magnetic gaps 42, 44 is opposite. Typically this motor system will be required to deliver the same force on both coils 26, 28 but in opposite directions in order to create a "reaction-force cancelling" arrangement and therefore it will be necessary to connect one of the coils in the reverse direction.

It's advantageous if both coils 26, 28 have the same motor-strength. This is relatively easily achieved since both magnetic gaps 42, 44 are in a series magnetic connection and the same magnetic field passes through both. Since approximately the same magnetic flux passes radially through both magnetic gaps 42, 44, the magnetic flux density in each magnetic gap is approximately proportional to the voice coil diameter. Therefore the flux density experienced by the smaller diameter voice coil 28 will be higher. However, this effect is balanced by the lower coil circumference of the smaller diameter voice coil 28 and as a result it is fairly easy to achieve approximately the same motor-strength BL on both coils 26, 28 (particularly as there are many geometric and coil parameters that can be adjusted to minimise the differences).

In some cases it may not be possible or desirable to achieve the same motor strength. In this case it might be advantageous to drive the two coils 26, 28 with different signals in order to still achieve approximate reaction-force cancellation.

It is possible that this motor system arrangement may have advantages when not used in a reaction force cancelling mode, where there is no particular relationship between the signals in the two coils. In this case the compactness and the overlap of the voice coils may still be advantageous.

Figure 5A:
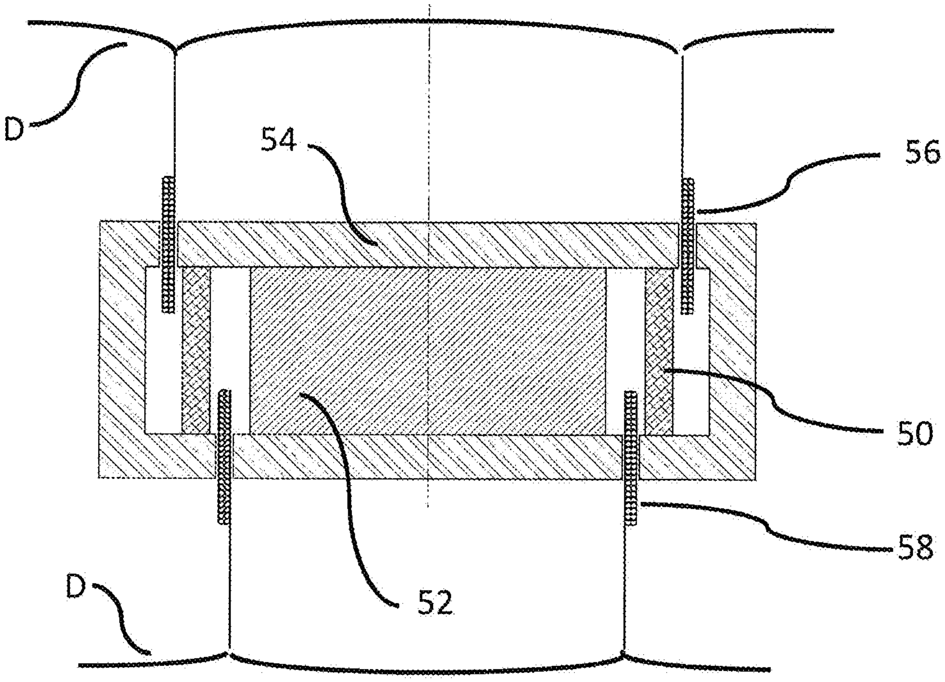
Figure 5B:
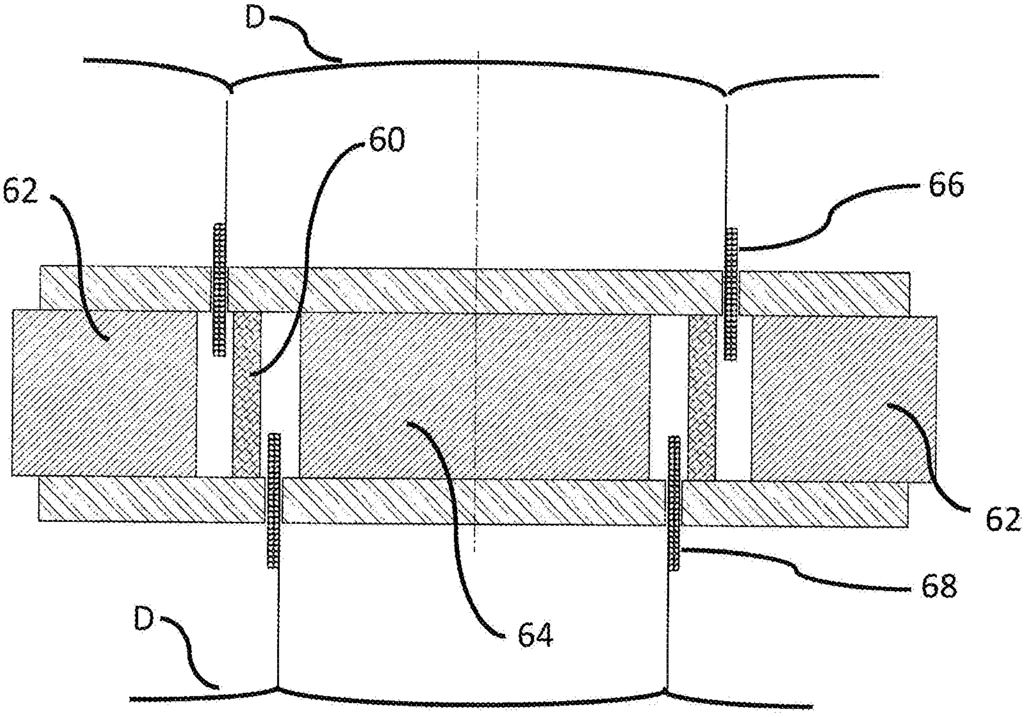
Figure 5C:
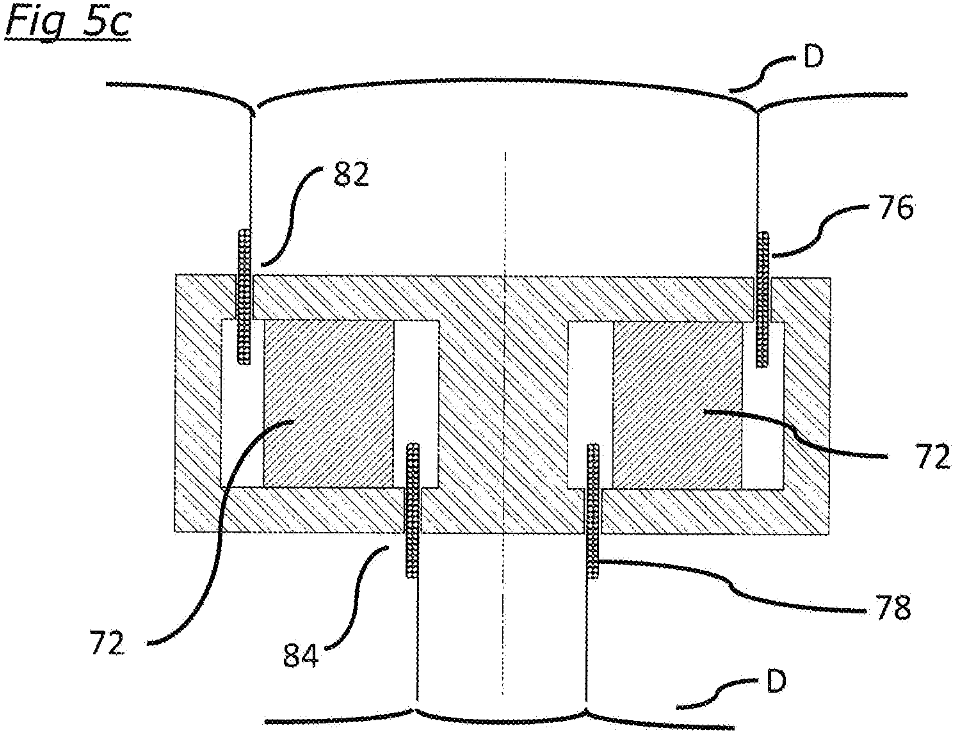

FIG. 5(*a*) shows an alternative embodiment in which the two coils 56, 58 are separated by a spacer 50 as in the previous embodiment, but with a disc 52 of magnetic material located inside the smaller coil 58. FIG. 5(*b*) shows another embodiment with two magnets 62,64 separated by a spacer 60. FIG. 5(*c*) shows a less useful modification having a single, ring magnet 72 located between the two coils 76, 78; this version is less useful because the difference in the coil diameters must be greater than in the previous embodiments in order to make space for the ring magnet 72, because the aluminium spacer in the other embodiments is helpful to minimise voice coil inductance and reduce distortion but cannot be used in this embodiment, and because the two gaps 82, 84 are now located magnetically in parallel so it is likely to be more difficult to achieve the same magnetic flux in both.

It will of course be understood that many variations may be made to the above-described embodiment without departing from the scope of the present invention. For example, the central cylindrical part of the yoke may be solid as shown in FIG. 3, or have an axial hole as shown in FIG. 1. The yoke is described as being made of steel, but any ferromagnetic material could be used, and the spacer is described as being made of aluminium, but any non-magnetic conductive metal or alloy could be used. The magnets can be of any suitable type or manufacture; the spacer could be a solid cylinder, it could be formed of segments fitted together, and/or it could have axially-extending apertures. The axially-extending gaps could contain a sound-absorbent material (such as an acoustic foam, a fabric, an open-cell foam, and a closed-cell foam or other porous material) to reduce resonance, as we described in our earlier application, GB2567673.

Where different variations or alternative arrangements are described above, it should be understood that embodiments of the invention may incorporate such variations and/or alternatives in any suitable combination.

The invention claimed is:

1. A loudspeaker comprising two acoustic diaphragms mounted to face in axially-opposed directions, two voice coils each having an axis and an axial length and being configured to reciprocate along its axis to drive one of the diaphragms, the axes being substantially parallel and both axes passing through both diaphragms, and at least one magnet forming part of a chassis assembly configured to provide two axially-extending gaps, one for each of the voice coils to reciprocate within, wherein the at least one magnet and the chassis assembly are adapted so that magnetic flux flows across the gaps in opposite directions, wherein the chassis assembly further comprises a spacer formed of a non-magnetic, conductive material shaped so as to extend axially and positioned so as to separate the two axially-extending magnetic gaps and wherein when in use the diaphragms are at their predetermined maximum negative excursions the voice coils overlap in the axial direction by between 50% and 90% of their average axial length, and wherein when in use the diaphragms are in a relaxed position, between their maximum negative and positive excursions, the voice coils do not overlap in the axial direction.

2. The loudspeaker according to claim 1 in which the axes are coaxial.

3. The loudspeaker according to claim 1 in which the two voice coils have the same axial length.

4. The loudspeaker according to claim 1 in which the mass of the diaphragm facing in one direction and the voice coil associated therewith is substantially the same as the mass of the diaphragm facing in the other direction and the voice coil associated therewith.

5. The loudspeaker according to claim 1 comprising a single magnet.

6. The loudspeaker according to claim 5 in which the magnet is shaped as a closed loop and extends axially so as to surround the two axially-extending magnetic gaps.

7. The loudspeaker according to claim 5 in which the magnet extends axially and is surrounded by the two axially-extending magnetic gaps.

8. The loudspeaker according to claim 1 comprising at least two magnets.

9. The loudspeaker according to claim 1 in which the chassis assembly comprises a yoke.

10. The loudspeaker according to claim 1 in which when in use the diaphragms move between their relaxed positions and their predetermined maximum negative excursions the voice coils do not overlap in the axial direction for the first 50% of that movement.

11. The loudspeaker according to claim 10 in which the voice coils do not overlap in the axial direction for the first 30% of their movement between the relaxed positions and their predetermined maximum negative excursions.

12. The loudspeaker according to claim 1 in which the relaxed position of one or both voice coils is located midway between its/their maximum negative and positive excursions.

* * * * *